(No Model.)
H. WALTER.
TOOTH OR BONE CUTTER.
No. 512,461. Patented Jan. 9, 1894.
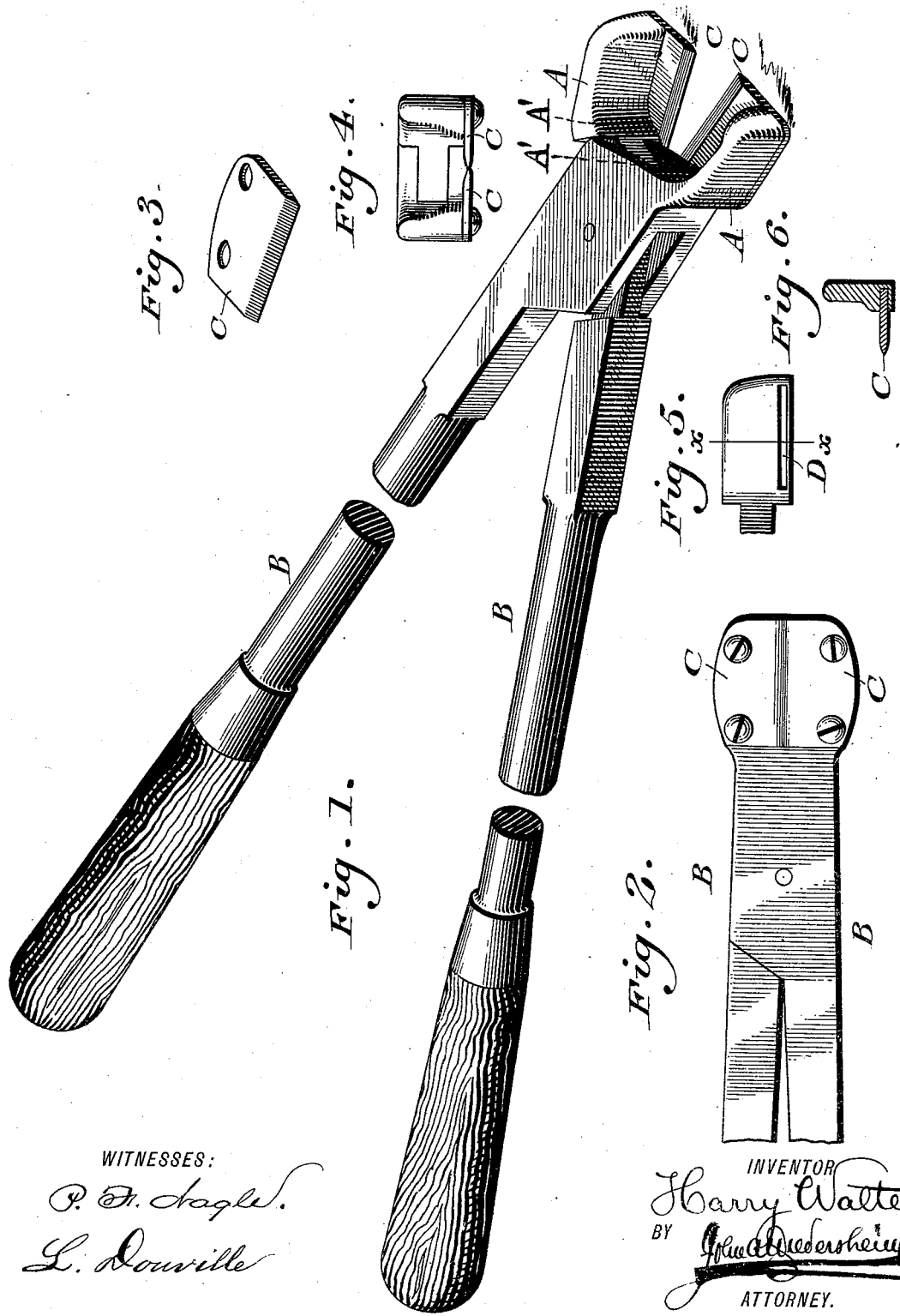
WITNESSES:
INVENTOR
ATTORNEY.

UNITED STATES PATENT OFFICE.

HARRY WALTER, OF PHILADELPHIA, PENNSYLVANIA, ASSIGNOR TO GEORGE W. TEUFEL, OF SAME PLACE.

TOOTH OR BONE CUTTER.

SPECIFICATION forming part of Letters Patent No. 512,461, dated January 9, 1894.

Application filed March 23, 1893. Serial No. 467,304. (No model.)

*To all whom it may concern:*

Be it known that I, HARRY WALTER, a citizen of the United States, residing in the city and county of Philadelphia, State of Pennsylvania, have invented a new and useful Improvement in Tooth or Bone Cutters, which improvement is fully set forth in the following specification and accompanying drawings.

My invention consists of a tooth or bone cutter formed of blades which are supported upon pivoted jaws as hereinafter set forth, so that a bone or tooth may be operated upon effectively and without injury to the adjacent portion of the bone or tooth, and the operation may be readily observed the chamber or recess existing between the jaws being of such dimensions in the proper direction of the length of the jaws as to fully receive a tooth within the same and support the part cut-off without the latter being liable to fall into the animal's mouth.

Figure 1 represents a perspective view of a tooth and bone cutter, embodying my invention. Fig. 2 represents a bottom plan view of a portion thereof. Fig. 3 represents a perspective view of one of the blades. Fig. 4 represents a front view. Fig. 5 represents a side elevation of a modification of one of the jaws. Fig. 6 represents a section on line $x, x$, Fig. 5, including a section of a blade fitted in the jaw in said figure.

Similar letters of reference indicate corresponding parts in the several figures.

Referring to the drawings: A, A designate two jaws, which are pivoted together, and provided with handled arms B, after the manner of a pair of forceps.

C designates blades which are connected with the jaws, at or near the under side thereof; and project toward each other, it being evident that the jaws may be closed with great power, owing to the leverage of the handles thereof, thus effectively operating upon the tooth or bone to which the blades are presented. It will be seen that the jaws are set back from the cutting edges of the blades, and a flat or horizontal portion of the upper face of each blade is exposed, so that a space exists between the jaws, for the reception of the adjacent portion of the tooth or bone operated upon, whereby crushing of or injury to said portion is prevented. Furthermore, the space between the jaws permit the blades to be seen, so that the operation may be readily observed. Again, the front walls of the axial portions A' of the jaws are somewhat set back, and the recess between the jaws extends rearward to said walls, by which provision the recess is lengthened and the entire length of a tooth may be received in the same, so that the blades may have full access to the tooth and the portion of the tooth cut-off may be sustained and prevented from dropping from the blades into the animal's mouth. The jaws also widen from top to bottom, so that broad bases are provided for the support of the blades it being evident that the jaws recede from said broad bases to the upper or outer ends of the same, so that while enlarged surfaces are formed for the attachment of the removable blade, greater strength is imparted to the blades where the greatest strain is occasioned, viz: the places of attachment of the blades. Furthermore, the receding inner sides of the jaws provide an increasing space toward the outer terminations of the jaws, so that crushing of or injury to the portion of the tooth or bone adjacent to that being operated upon is prevented, as has been stated.

In the modified form of jaws shown in Figs. 5 and 6 near the bottom thereof, are slots D, which extend transversely into the jaws, at or about a right angle to the axis thereof, and receive the shanks of the blades C, thus connecting the blades with the jaws, and firmly supporting the same.

Having thus described my invention, what I claim as new, and desire to secure by Letters Patent, is—

A cutter for veterinary purposes consisting of the handled jaws A with broad bases, and removable blades C connected with said bases, said jaws receding to the outer ends, the recess between the jaws extending rearward to the front walls of the axial portions of the jaws, and the parts named being combined substantially as described.

HARRY WALTER.

Witnesses:
JOHN A. WIEDERSHEIM,
R. H. GRAESER.